United States Patent [19]
Pan et al.

[11] Patent Number: 5,889,673
[45] Date of Patent: Mar. 30, 1999

[54] MANUFACTURING METHOD AND SYSTEM FOR DYNAMIC DISPATCHING OF INTEGRATED CIRCUIT WAFER LOTS

[75] Inventors: Yirn-Sheng Pan; Horng-Huei Tseng, both of Hsinchu, Taiwan

[73] Assignee: Vanguard International Semiconductor Corporation, Hsin-Chu, Taiwan

[21] Appl. No.: 775,057

[22] Filed: Dec. 27, 1996

[51] Int. Cl.$^6$ ........................................... H03M 5/01
[52] U.S. Cl. ................... 364/468.03; 364/468.01; 364/468.05; 364/468.07; 364/468.09; 364/468.28
[58] Field of Search ................. 364/468.03, 468.01, 364/468.09, 468.05, 468.07, 468.28

[56] References Cited

U.S. PATENT DOCUMENTS

| | | | |
|---|---|---|---|
| 4,852,001 | 7/1989 | Tsushima et al. | 364/401 |
| 4,896,269 | 1/1990 | Tong | 364/468.07 |
| 5,077,661 | 12/1991 | Jain et al. | 364/402 |
| 5,128,860 | 7/1992 | Chapman | 364/401 |
| 5,255,181 | 10/1993 | Chapman et al. | 364/401 |
| 5,612,886 | 3/1997 | Weng | 364/468.07 |

*Primary Examiner*—William Grant
*Assistant Examiner*—Chad Rapp
*Attorney, Agent, or Firm*—George O. Saile; Stephen B. Ackerman; Graham S. Jones, II

[57] ABSTRACT

In dynamic dispatching of integrated circuit wafer lots in an integrated circuit fabrication plant, determine the Stage Achievement Rate (SAR) of descendant stages for each candidate stage to be processed by the fabrication plant. With the loading of descendant stages for each candidate stage, determine the Adjusted Loading (AL), where AL=SAR*(Loading of descendant stages for each candidate stage). Determine the Picked Probability (PP) equal to Normalized 1/AL of grouped descendant stages. Determine the Estimated Loading (EL) of descendant stages for each candidate stage. Determine the Estimated Achievement Rate (EAR) of descendant stages for each candidate stage. Next, determine the Estimated Adjusted Loading (EAL) of descendant stages for each candidate stage. Then determine the Total Estimated Adjusted Loading (TEAL) for each candidate stage. Finally, determine the Dynamic Dispatching Order (DDO) of the wafer lots.

20 Claims, 8 Drawing Sheets

MANUFACTURING METHOD AND SYSTEM FOR DYNAMIC DISPATCHING OF INTEGRATED CIRCUIT WAFER LOTS

BACKGROUND OF THE INVENTION

1. Field of the Invention

This invention relates to process control of manufacturing of integrated circuit (IC) chips and more particularly to dispatching of work to the various processing stages in a fabrication plant.

2. Description of Related Art

The traditional dispatching rules (e.g. First in First Out (FIFO), Earliest Due Date (EDD), Critical Ratio (CR), etc.) cannot meet the requirements of Integrated Circuit (IC) manufacturing due to the complexity of the fabrication process (above 300 process steps) and the limited resource in IC plants. Inappropriate dispatching rules cause higher cycle times and reduce machine utilization rates, resulting in decreased customer satisfaction and reduced flexibility in product life cycle. The net result is increased capital investment cost.

SUMMARY OF THE INVENTION

An improved IC manufacturing dynamic dispatching rule is needed which takes into consideration the machine output target and achievement rate to decrease the loss in machine time, thereby increasing utilization and balancing the product line and achieving the wafer output target. Advantages of the present invention include as follows:

(1) Considering the Running WIP:

The fact that the processing of the running WIP can be completed, if only partially, also affects the evaluation of the stage target. This provides improved ability to achieve the target.

(2) Not Considering Only the Next Stage:

Considering only the next stage will cause misleading FAB (Fabrication Plant) performance, and due to short-term planing are always dedicated on one day, so stages that will be effected in one day time span are all considered.

(3) Feasible Computation:

Many dispatching methods require consideration of all stages by the algorithm, but that will cause impractical computations or excessively lengthy calculation times.

(4) Increase Machine Utilization:

Considering the machine capacity and machine loading, a machine with a lower rate of utilization would have a high probability to be selected.

(5) Line Balance:

This method takes into consideration machine loading and the Stage Achievement Rate (SAR), which is defined below. The event of a high level of loading and a higher achievement rate will reduce the probability of selection until each stage finally reaches a balanced loading status. In accordance with this invention, dynamic dispatching of integrated circuit wafer lots in an integrated circuit fabrication plant is provided. First, determine the Stage Achievement Rate (SAR) of descendant stages for each candidate stage to be processed by the fabrication plant. Next, determine the Loading of descendant stages for each candidate stage. Subsequently, determine the Adjusted Loading (AL), where AL=SAR*(Loading of descendant stages for each candidate stage). Then determine the Picked Probability (PP) equal to Normalized p1/AL of grouped descendant stages. Next determine the Estimated Loading (EL) of descendant stages for each candidate stage. Later, determine the Estimated Achievement Rate (EAR) of descendant stages for each candidate stage. Determine the Estimated Adjusted Loading (EAL) of descendant stages for each candidate stage. Then, determine the Total Estimated Adjusted Loading (TEAL) for each candidate stage. Finally, determine the Dynamic Dispatching Order (DDO) of the wafer lots.

Preferably, the Stage Equivalent Output (SEO) is calculated with the formula, as follows:

$$SEO=AO+\{CR*(R\_WIP)\}$$

where

AO is Actual Output

CR is Completed Ratio, and

R_WIP is Running WIP.

Preferably, the Stage Output Target (SOT) is obtained by the system.

Preferably, the SAR is calculated with the formula as follows:

$$SAR = \frac{\text{Stage Equivalent Output } (SEO)}{\text{Stage Output Target } (SOT)}$$

It is preferred that the Loading of descendant stages for each candidate stage is calculated with the formula as follows:

$$\text{Loading} = \frac{\text{Required hours}}{\text{Remaining Hours}}$$

Preferably, the Required Hours are calculated as follows:

$$\text{Required Hours} = \left[\text{Stage Queued} + \left[\begin{array}{c}\text{Stage Uncompleted Ratio}\end{array}\right] * \left[\begin{array}{c}\text{Running WIP}\end{array}\right]\right] * \left[\begin{array}{c}\text{Standard time Hours piece}\end{array}\right]$$

Preferably, the calculation of $\Sigma$ (1/AL) of same grouped descendant stage is followed by calculation of 1/AL, and calculation of Picked Probability (PP) of descendant stage "i" where the equation is calculated as follows:

$$PP = \frac{\frac{1}{AL}}{\Sigma \frac{1}{AL}}$$

Preferably, there is selection of Candidate Stage $S_i$, where $i=1, 2, \ldots, n$ and Stage Quantity $Q_i$, where $i=1, 2, \ldots, n$ followed by calculating the value of the Adjusted Queued WIP (AQW) as follows:

$$(AQW)=\text{Queued WIP}+\{Q_i*(1-PP)\}$$

followed by calculating the value of the Adjusted Required Hours (ARH) as follows:

$$ARH=AQW+(UR*\text{running WIP})*STD\ Time$$

where

UR=Uncompleted Ratio and

R_WIP=Running WIP followed by calculating Estimated Loading (EL) as follows:

$$(EL) = \frac{\text{Adjusted required hours}}{\text{Remaining Hours}}$$

Preferably, there is selection, as follows:

Candidate Stage $S_i$, where i=1, 2, ..., n and

Stage Quantity $Q_i$, where i=1, 2, ..., n, and then calculating the value of the Adjusted Equivalent Output (AEO) as follows:

AEO=AO+(Qi*PP)+(CR×R_WIP)

AO=Actual Output
Qi=Stage Quantity
PP=Picked Probability
CR=Completed Ratio
R_WIP=Running WIP, and calculating the value of the Estimated Achievement Rate (EAR) as follows:

$$EAR = \frac{AEO}{SOT}$$

where
AEO=Adjusted Equivalent Output
SOT=Stage Output Target.

Preferably, the Estimated Adjusted Loading (EAL) is calculated from the Estimated Loading (EL) data and the Estimated Achievement Rate (EAR) data, as follows:

EAL=EL*EAR.

Preferably, TEAL is calculated as follows:

TEAL=ΣEAL.

Preferably, the first priority candidate stage is selected where "i" is a stage of the process comprising:

determining the Dynamic Dispatching Order (DDO)=Min {TEAL i} which is the minimum value of the TEAL of stage i, where i=1, 2, ..., n is an integer representing the stage currently under consideration depending upon the number of stages which are required for the particular fabrication facility.

BRIEF DESCRIPTION OF THE DRAWINGS

The foregoing and other aspects and advantages of this invention are explained and described below with reference to the accompanying drawings, in which.

DESCRIPTION OF THE PREFERRED EMBODIMENT

Figure 1:
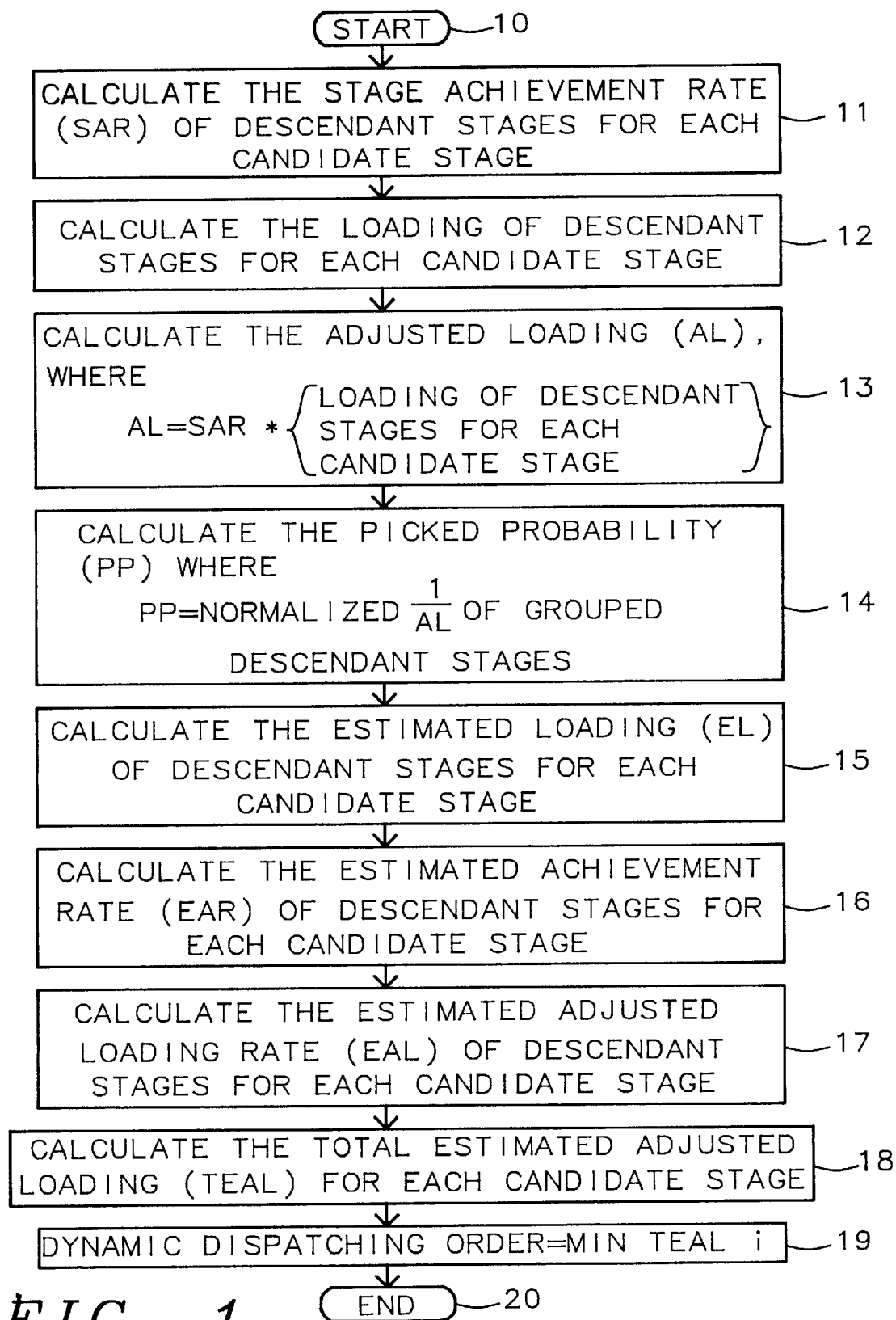
FIG. 1 shows the main flow chart of the overall dynamic dispatching in accordance with the method and system of this invention.

Definitions (1) WIP:

(Work In Process) Wafers being included in the production line from wafer start to QC (Quality Control) output inspection, and those queued or in process in the production line.

WIP=Queued WIP+Running WIP        (EQ. 1)

where as follows:

Queued WIP (QWIP)=WIP which has not been processed.

Running WIP (R_WIP)=partially completed WIP.

(2) Dispatching:

Dispatching is a method or rule for selecting the appropriate lots to be processed from Queued WIP. After processing of a run has been completed for a given stage, the next set of lots in selected for processing from the Queued WIP of that stage.

(3) Dynamic Dispatching:

Unlike popular dispatching rules (e.g. FIFO, EDD, etc.), the dynamic dispatching method takes into consideration many variables (e.g. WIP-Cycle time-Capacity-Line balance, etc.) to be input as parameters of dynamic dispatching method.

(4) Dispatched Machine:

When a machine executes the dynamic dispatching method to select lots, this machine is so called dispatched machine.

(5) Stage:

The IC manufacturing process consists of above 300 process steps or recipes. The same recipes are used in a process flow due to the fact that the same program is employed. To perform scheduling control and naming easily, a stage is defined as a set (collection) of several recipes which perform a broader function such as wafer marking or zero aligning. A stage is based on process functions which are performed, so each stage has a unique part in the full process flow of each product.

| Example | |
| --- | --- |
| Stage | Description |
| MKWF | Wafer Mark |
| ALZER | Zero Align |
| ETZER | Zero Etching |
| STZER | Zero Stripe |
| ALNW | N Well Align |

(6) Stage Output Target:

The stage output target is set by the planner considering the capacity of the stage to handle lots of wafers and the WIP allocated thereto.

(7) Stage Actual Output (SAO):

The number of wafers passing through a stage in each time period (time point).

(8) Stage equivalent output (SEO):

In each time period (time point), the running WIP had partially completed a lot of wafers. So the stage output should consider such completed wafers to reflect the real output from the total lot of wafers in the workload.

$$SEO = SAO + (SCR * R\_WIP) \quad (EQ. 2)$$

where

SCR=Stage Completed Ratio, which is the ratio of completed wafers from the workload.

(9) Stage Achievement Rate (SAR) (FIG. 6):

$$SAR = \frac{\text{Stage Equivalent Output } (SEO)}{\text{Stage Output Target } (SOT)} \quad (EQ. 3)$$

(10) Candidate Stage:

During performance of the dispatching method, after a machine completes performance of a given process on lots allocated to that machine, then the system chooses the next lots to be processed by that machine from Queued WIP. Then those Queued WIP lots will have their own stage for processing, which is identified as the "candidate stage". Thus selection of which lots are to be processed involves allocation of the "candidate stage".

(11) Descendant Stages:

In a one day time span, after processing of a dispatched machine, each candidate stage requests processing by the next machine. But the next machine could service other stages and those other stages would also join dispatching at next dispatching, so those stages are referred to as descendant stages.

(12) Grouped Descendant Stages:

According to the same machine the descendant stages are grouped. Since descendant stages use the same machine, there is competition in next lot dispatching, that is selecting of the next lots.

(13) Remaining hours:

During a period of one day, the hours remaining at each dispatching selection point.

(14) Required Hours:

Considering the Queued WIP and uncompleted (i.e. running WIP) the hours needed to process a group of wafers.

$$\begin{bmatrix}\text{Required}\\ \text{WIP}\end{bmatrix} = \begin{bmatrix}\text{Stage}\\ \text{Queued WIP}\end{bmatrix} + \begin{bmatrix}\text{Stage}\\ \text{uncompleted}\\ \text{Running WIP}\end{bmatrix} * \begin{bmatrix}\text{Standard}\\ \text{time}\end{bmatrix}$$

Note: Standard time = (hour/pieces)

(15) Loading:

$$\text{Loading} = \frac{\text{Required hours}}{\text{Remaining Hours}} \quad (EQ. 4)$$

If the loading index is greater than 1, that means that WIP exceeds stage capacity. If the loading index is far less than 1, that means fewer WIP on that stage so machine capacity would be wasted.

Figure 4:
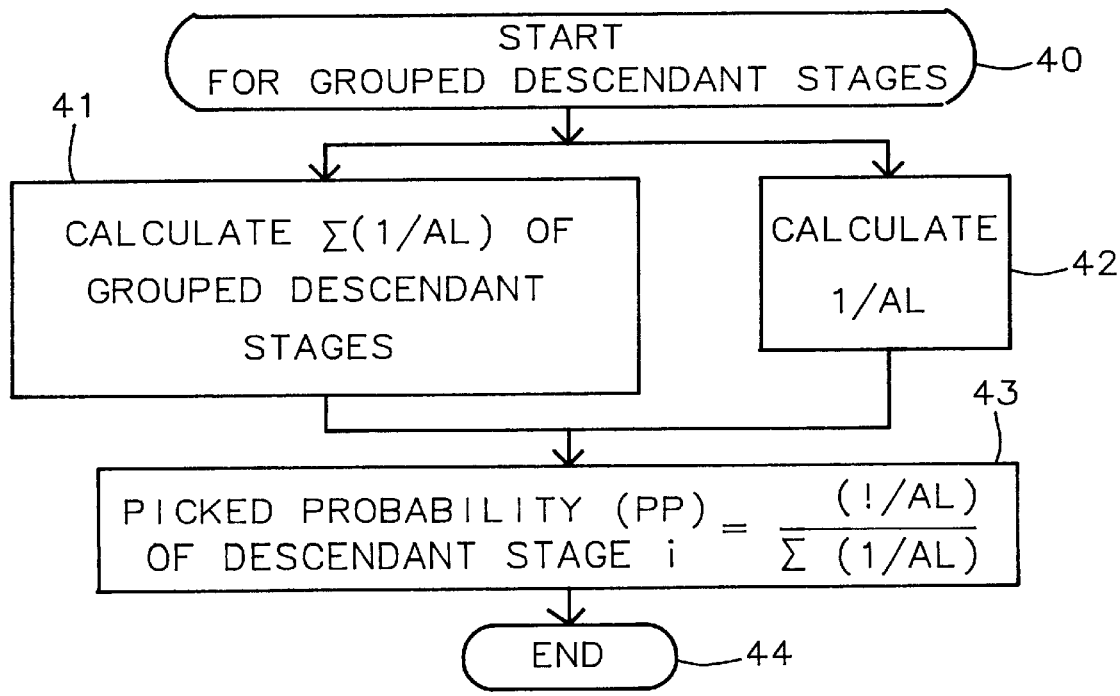
FIG. 4 shows a diagram for calculating picked probability in accordance with FIG. 1.

(16) Picked Probability (FIG. 4):

In IC manufacturing, each machine can process more than one stage (e.g. an implanter can process both the N_Well_Implant stage and the N_Channel_Implant) stage. According to the stage loading index (FIG. 3) and achievement rate (FIG. 2), the selected probability of each stage in one machine can be calculated as shown in FIG. 4, which is described below.

Figure 10A:
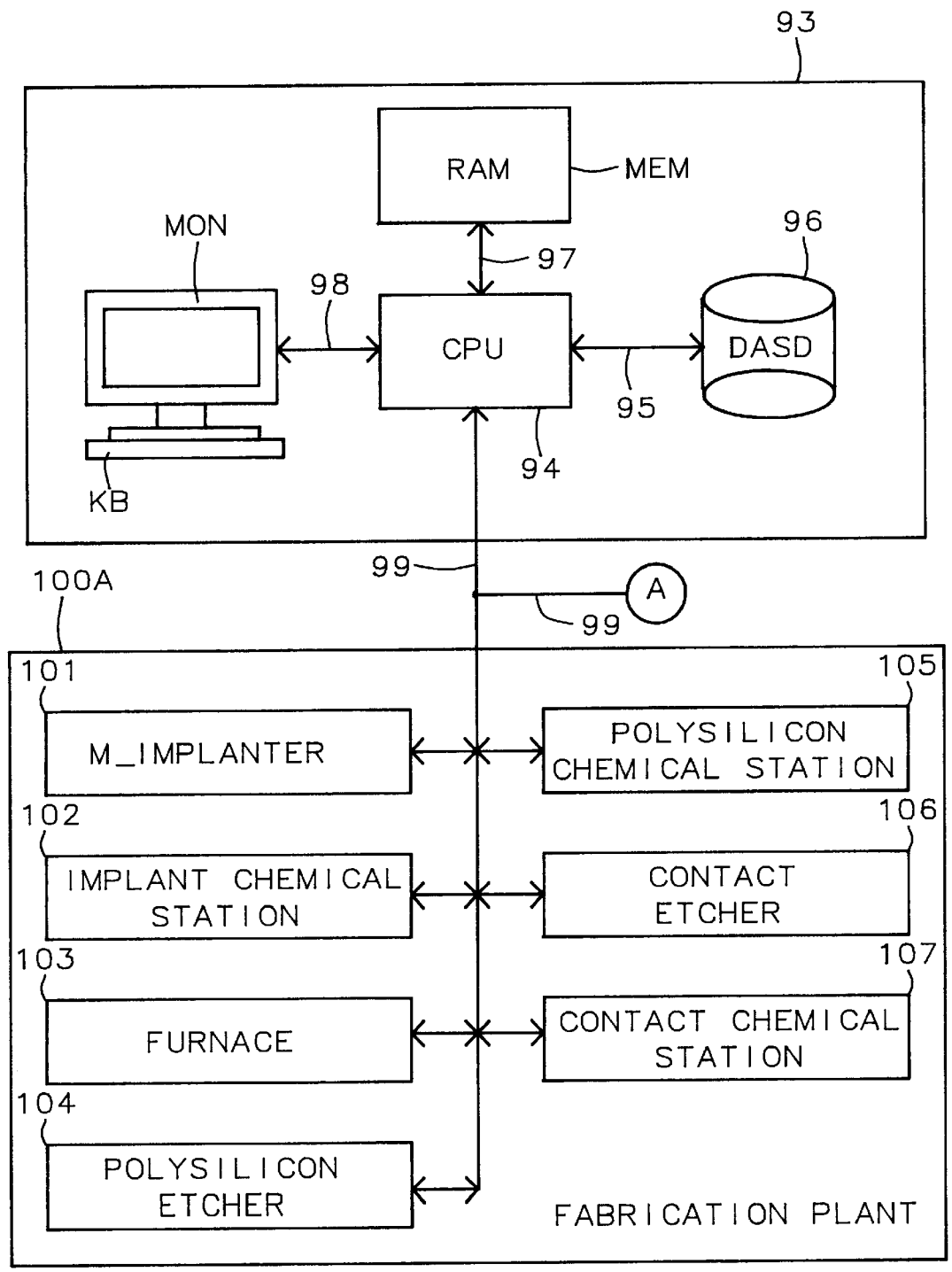
FIGS. 10A and 10B show the portions of the fabrication plant and a computer which provides control data for portions of a plant in accordance with FIG. 1 and the method and system of this invention.
Figure 10B:
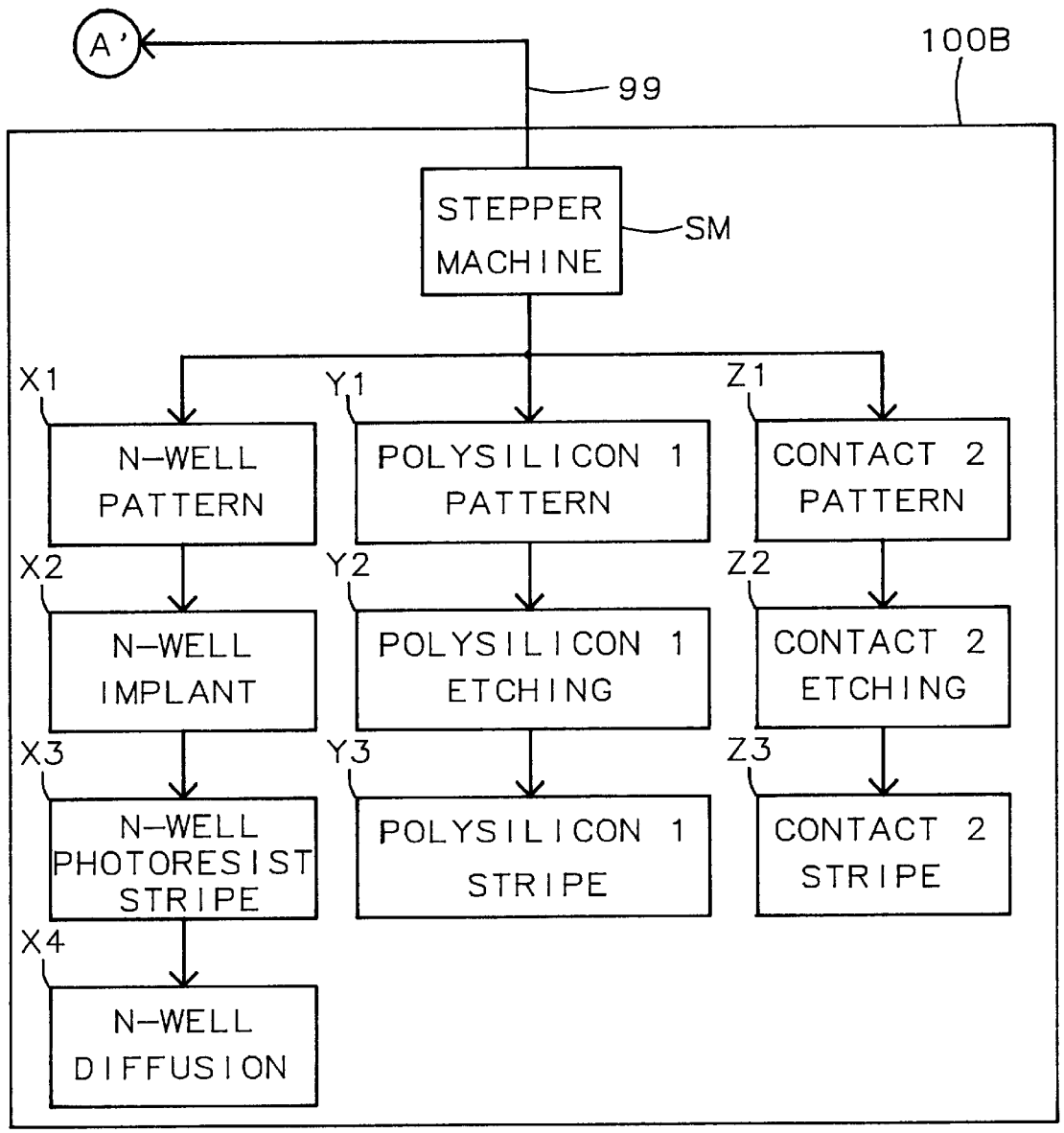

FIGS. 10A and 10B show a manufacturing system with a computer control system 93 and the portions 100A and 100B of the fabrication plant which are controlled by computer system 93. Computer control system 93 includes a (Central Processing Unit) CPU 94 connected by line 95 to DASD (Direct Access Storage Device) 96 (e.g. a disk drive) and by line 97 to Random Access Memory (RAM) MEM. In addition, the CPU 94 is connected to monitor MON by line 98. The monitor MON includes a keyboard KB. The monitor is used by the operator to enter data on the keyboard and other conventional interactive means while the monitor MON includes a display screen for display of data from the CPU 94 to the operator for use in making selections of alternative features during operation of the system of FIGS. 10A and 10B. The CPU 94 is connected by line 99 to stages 101–107 in the fabrication plant 100 for collection of data from the stages 101–107 and for sending instructions to the stages 101–107.

FIG. 1 shows the main flow chart of the overall dynamic dispatching method of this invention.

In block 11 the CPU 94 in FIG. 10 calculates the Stage Achievement Rate (SAR) of descendant stages for each candidate stage to be processed by the fabrication plant 100. This function is described in more detail below with reference to FIG. 2.

In block 12, the CPU 94 calculates the Loading of descendant stages for each candidate stage, which is described below with reference to FIG. 3, block 33 which provides an illustration thereof.

In block 13 the CPU 94 calculates the Adjusted Loading (AL), where:

$$AL = AR * \begin{bmatrix}\text{Loading of descendant stages}\\ \text{for each candidate stage}\end{bmatrix} \quad (EQ. 5)$$

Calculation of the Adjusted Loading (AL) is described below with reference to FIG. 3 which provides an illustration thereof.

In block 14 the CPU 94 calculates the Picked Probability (PP)=Normalized 1/AL of grouped descendant stages, which is described below with reference to FIG. 4 which provides an illustration thereof.

In block 15 the CPU 94 calculates the Estimated Loading (EL) of descendant stages for each candidate stage, which is described below with reference to FIG. 5 which provides an illustration thereof.

In block 16 the CPU 94 calculates the Estimated Achievement Rate (EAR) of descendant stages for each candidate stage, which is described below with reference to FIG. 6 which provides an illustration thereof.

In block 17, the CPU 94 calculates the Estimated Adjusted Loading (EAL) of descendant stages for each candidate stage, which is described below with reference to FIG. 7 which provides an illustration thereof.

In block 18 the CPU 94 calculates the Total Estimated Adjusted Loading (TEAL) for each candidate stage, which is described below with reference to FIG. 8 which provides an illustration thereof.

In block 19 the CPU 94 calculates the Dynamic Dispatching Order (DDO)=Min {TEAL i} which is the minimum value of the TEAL of stage i, where i=1, 2, . . . , n is an integer representing the stage currently under consideration depending upon the number of stages which are required for the particular fabrication facility, as will be understood by those skilled in the art. This function is described below with reference to FIG. 9 which provides an illustration thereof.

Method Description

Step 1

Calculating the Stage Achievement Rate (SAR)

Figure 2:
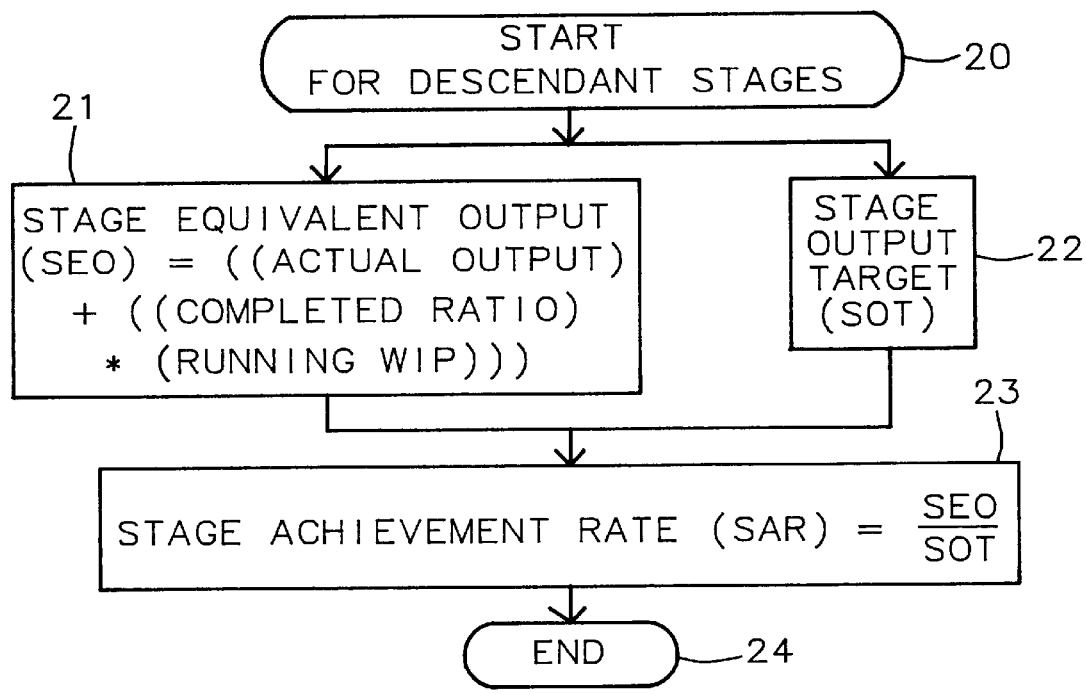
FIG. 2 a flow chart is shown of a routine for calculating the Stage Equivalent Output (SEO) and the Stage Achievement Rate (SAR) in accordance with the method and system of this invention and FIG. 1.

In FIG. 2 a flow chart is shown of a routine for calculating the Stage Equivalent Output (SEO) and the Stage Achievement Rate (SAR). In block 20, the routine is started for descendant stages.

In block 21, the Stage Equivalent Output (SEO) is calculated with the formula, as follows:

$$SEO=AO+\{CR*(R\_WIP)\}, \quad (EQ. 6)$$

where

AO is Actual Output

CR is Completed Ratio

R_WIP is Running WIP

In block 22, the Stage Output Target (SOT) stored in the DASD 96 is obtained by the system for use in block 23.

In block 23, the Stage Achievement Rate (SAR) is calculated with the formula as follows:

$$SAR = \frac{\text{Stage Equivalent Output } (SEO)}{\text{Stage Output Target } (SOT)} \quad (EQ. 7)$$

The SAR value in the above equation is stored in the DASD 96 or memory 98 for future use.

Step 2

Calculating the Loading

In block 33 of FIG.3, the CPU 94 uses the data from blocks 31 and 32 (described below) to determine the Loading from the equation as follows:

$$\text{Loading} = \frac{\text{Required hours}}{\text{Remaining Hours}} \quad (EQ. 8)$$

Step 3

Calculating the Adjusted Loading (AL)

Figure 3:
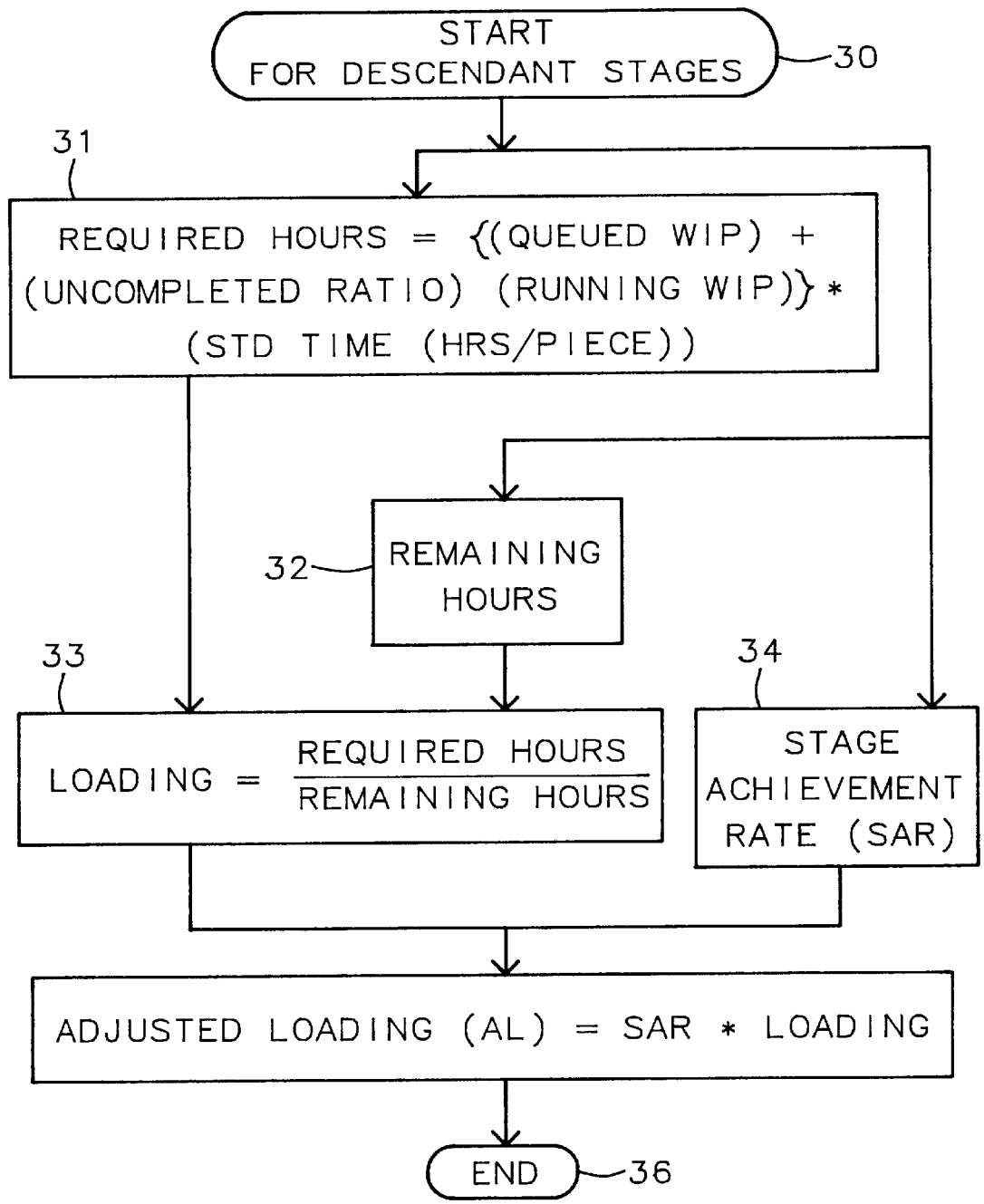
FIG. 3. shows a routine for calculating the Adjusted Loading (AL) of the descendant stages in accordance with FIG. 1.

FIG. 3. shows a routine for calculating the Adjusted Loading (AL) of the descendant stages, which starts in block 30. Block 30 leads to block 31 and block 34.

In block 31, the CPU 94 determines the Required Hours for use in block 33. The program determines the Required Hours={(Queued WIP)+[(uncompleted ratio)*(running WIP)]}*{STD Time (hour/pieces)}. To restate the relationship, the equation reads as follows:

$$\text{Required Hours} = \left[ \begin{array}{c} \text{Stage} \\ \text{Queued} \\ \text{WIP} \end{array} + \left[ \begin{array}{c} \text{Stage} \\ \text{Uncompleted} \\ \text{Ratio} \end{array} \right] * \left[ \begin{array}{c} \text{Running} \\ \text{WIP} \end{array} \right] \right] * \left[ \begin{array}{c} \text{Standard} \\ \text{time} \\ \frac{\text{Hours}}{\text{piece}} \end{array} \right] \quad (EQ. 9)$$

In block 32, the CPU 94 retrieves the data on remaining hours and supplies for use in block 33 along with the required hours data from block 31.

In block 33, the CPU 94 uses the data from blocks 31 and 32 to retrieve the Loading data calculated in Step 2 above. The calculation of Loading performed in step 2 is shown in block 33 for convenience of illustration.

Block 34 retrieves the SAR for use in block 35.

In block 35 the CPU 94 uses the data from blocks 33 and 34 to calculates the Adjusted Loading (AL), where:

$$AL=SAR*LOADING \quad (EQ. 10)$$

for the loading of descendant stages, for each candidate stage.

Block 35 leads to block 36 which ends the routine of FIG. 3.

Step 4

Calculating Picked Probability (PP)

FIG. 4 shows a diagram for calculating picked probability which starts in block 40 which is the start for grouped descendant stages. Block 40 leads to block 41 and block 42.

In block 41, the CPU 94 calculates Σ (1/AL) of the grouped descendant stage, which is retained in memory for use in block 43.

In block 42, the CPU 94 calculates 1/AL which is retained in memory for use in block 43.

In block 43, the CPU 94 calculates Picked Probability (PP) of descendant stage "i" where the equation is calculated as follows:

$$PP = \frac{\frac{1}{AL}}{\Sigma \frac{1}{AL}} \quad (EQ. 11)$$

In block 43, the Picked Probability (PP) calculation routine ends.

Step 5

Calculating the Estimated Loading (EL)

Figure 5:
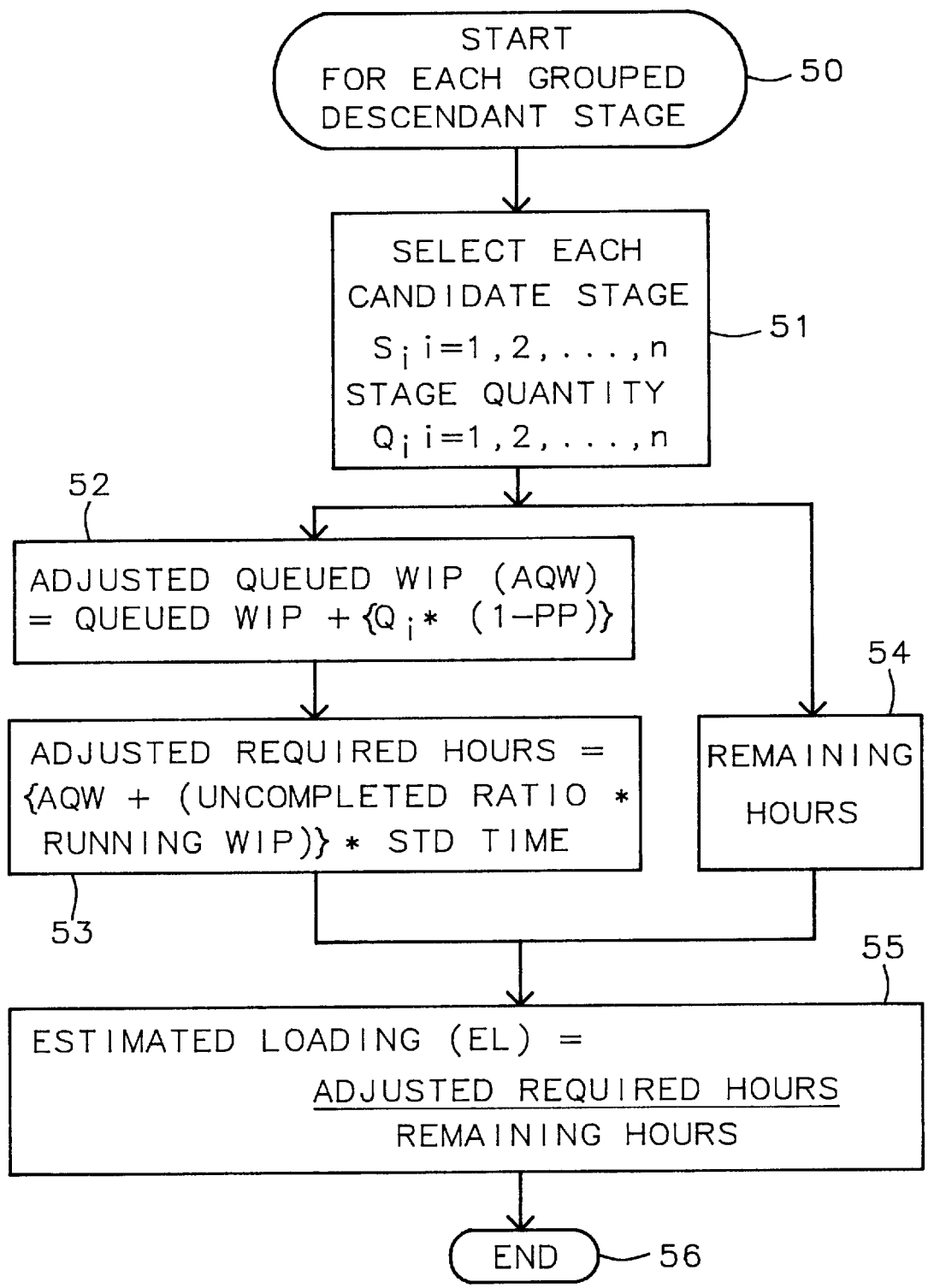
FIG. 5 shows the block diagram of a routine for calculating Estimated Loading in accordance with FIG. 1.

FIG. 5 shows the block diagram of a routine for calculating Estimated Loading, which starts in block 50 (for each grouped descendant stage). Start block 50 (for each grouped descendant stage) leads to block 51 where the CPU 94 performs the selection functions as follows:

Select Candidate Stage $S_i$, where i=1, 2, ..., n and

Select Stage Quantity $Q_i$, where i=1, 2, ..., n

In FIG. 5, there is a loop for calculating the value of EL for each stage (Stage 1, Stage 2... Stage n) where there are n stages.

Block 51 leads to both block 52 and block 54.

In block 52, the CPU 94 calculates the value of the Adjusted Queued WIP (AQW) as follows:

$$(AQW)=\{\text{Queued WIP}+Q_i\}*(1-PP) \quad (EQ. 12)$$

The function of block 52 involves securing the Queued WIP data from stored data in the computer 93, $Q_i$ data produced in block 51 and PP data produced in block 43 in FIG. 4.

In block 53, the CPU 94 calculates the value of the Adjusted Required Hours (ARH) as follows:

$$ARH = AQW + \left[ \left[ \begin{array}{c} \text{UNCOMPLETED} \\ \text{RATIO} \end{array} \right] * \left[ \begin{array}{c} \text{RUNNING} \\ \text{WIP} \end{array} \right] \right] * \left[ \begin{array}{c} \text{STD} \\ \text{TIME} \end{array} \right] \quad (EQ. 13)$$

In block 54, the CPU 94 retrieves the data on remaining hours (See block 32 in FIG. 3) and supplies them for use in block 55 along with the adjusted required hours data from block 53.

In block 55, the CPU 94 calculates Estimated Loading (EL) as follows:

$$(EL) = \frac{\text{Adjusted required hours}}{\text{Remaining Hours}} \quad \text{(EQ. 14)}$$

In block 56, the calculation of the Estimated Loading routine ends.

Step 6

Calculating the Estimated Achievement Rate (EAR)

Figure 6:
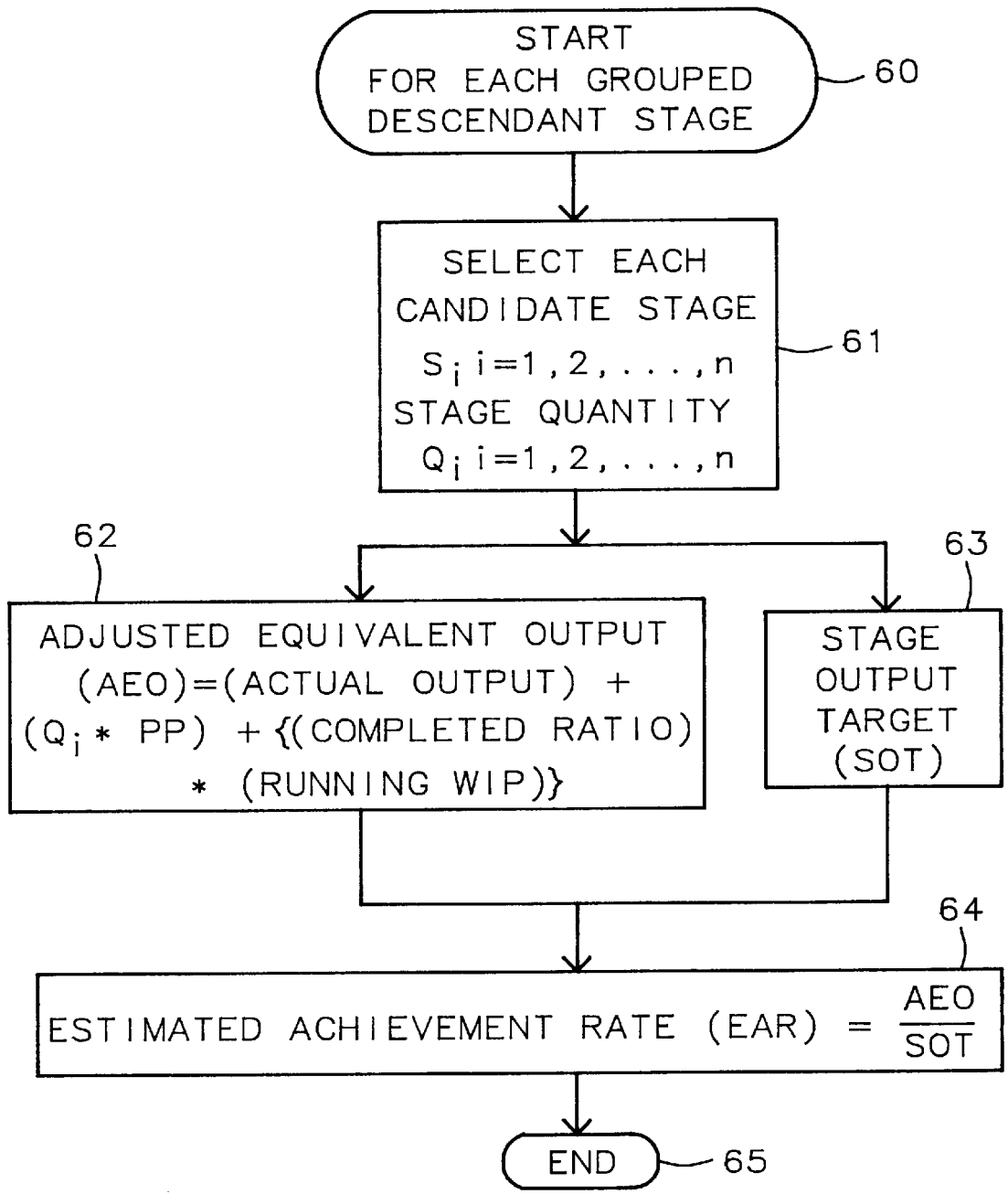
FIG. 6 shows the block diagram of a routine for calculating the Estimated Achievement Rate (EAR) in accordance with FIG. 1.

FIG. 6 shows the block diagram of a routine for calculating the Estimated Achievement Rate (EAR), which starts in block 60 (for each grouped descendant stage). Start block 60 (for each grouped descendant stage) leads to block 61 where the CPU 94 performs the selection functions as follows:

Select Candidate Stage $S_i$, where i=1, 2, ..., n and
Select Stage Quantity $Q_i$, where i=1, 2, ..., n In FIG. 6, there is a loop for calculation of EAR for each stage (Stage 1, Stage 2 ... Stage n) where there are n stages.

Block 61 leads to both block 62 and block 63 which in turn lead to block 64.

In block 62, the CPU 94 calculates Adjusted Equivalent Output (AEO) as follows:

$$AEO = AO + (Qi*PP) + (CR \times R\_WIP) \quad \text{(EQ. 15)}$$

AO=Actual Output
Qi=Stage Quantity
PP=Picked Probability
CR=Completed Ratio
R_WIP=Running WIP In block 63 the CPU 94 retrieves the data on Stage Output Target (SOT), see block 22 in FIG. 2.

In block 64, the Estimated achievement rate (EAR) is calculated as follows:

$$EAR = \frac{AEO}{SOT} \quad \text{(EQ. 16)}$$

where
AEO=Adjusted Equivalent Output
SOT=Stage Output Target

In block 64, the calculation of the Estimated Loading routine ends.

Step 7

Calculating the Estimated Adjusted Loading (EAL)

Figure 7:
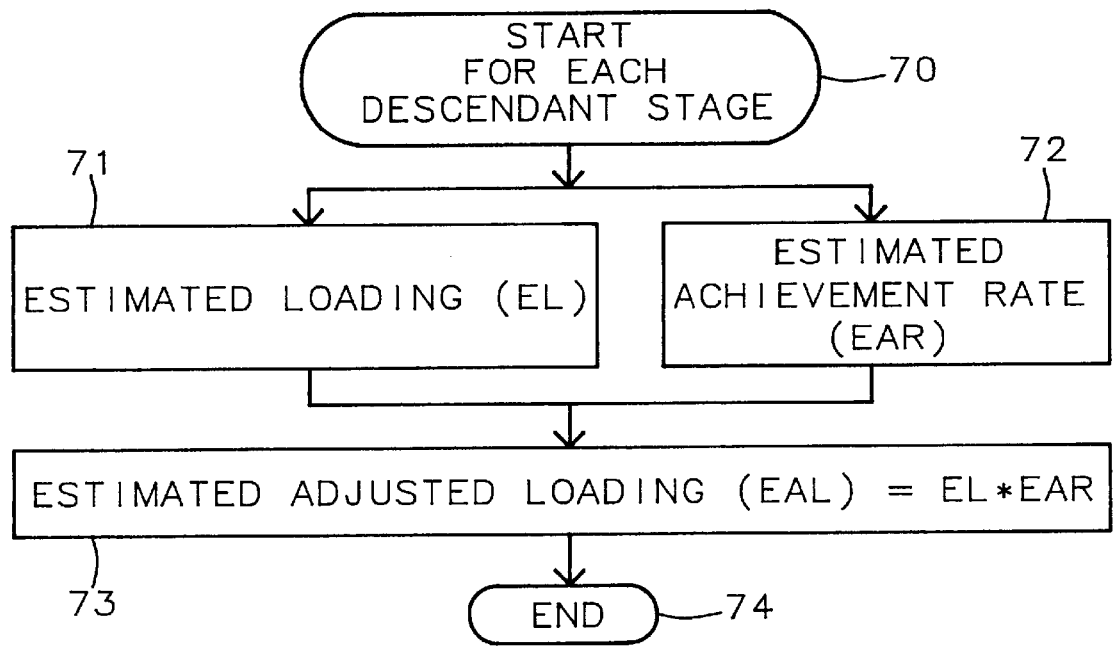
FIG. 7 shows a block diagram for calculating the Estimated Adjusted Loading (EAL) in accordance with FIG. 1.

FIG. 7 shows a block diagram for calculating the Estimated Adjusted Loading (EAL), which starts in block 70 (for each descendant stage). Start block 70 (for each descendant stage) leads to block 71 and 72. In block 71 the Estimated Loading (EL) data from block 55 in FIG. 5 is retrieved by CPU 94. In block 72, the Estimated Achievement Rate (EAR) data from block 64 in FIG. 6 is retrieved by CPU 94.

In block 73, the Estimated Adjusted Loading (EAL) is calculated as follows:

Estimated Adjusted Loading (EAL)=EL*EAR

In block 74, the calculation of the Estimated Adjusted Loading (EAL) routine ends.

Step 8

Calculating Total Estimated Adjusted Loading (TEAL)

Figure 8:
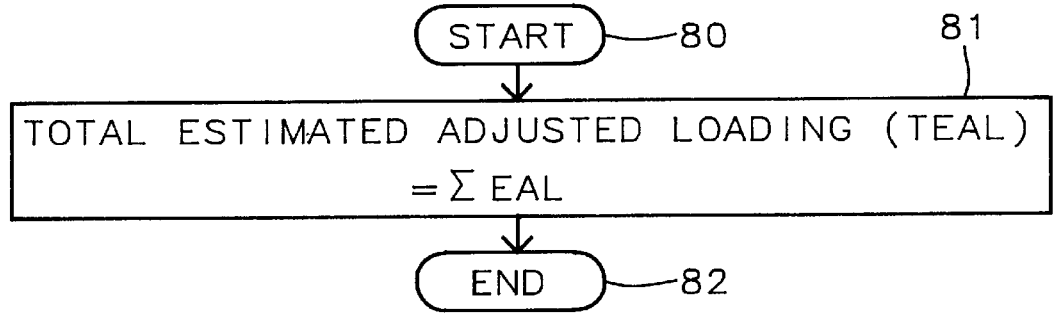
FIG. 8 shows a block diagram for calculating the Total Estimated Adjusted Loading in accordance with FIG. 1.

FIG. 8 shows a block diagram for calculating the Total Estimated Adjusted Loading which starts in block 80 and leads to block 81 which calculates Total Estimated Adjusted Loading (TEAL)=ΣEAL summing the data produced in in block 73 in FIG. 7.

In block 82, the calculation of the Total Estimated Adjusted Loading (TEAL) routine ends.

Step 9

Choose the Minimum TEAL

Figure 9:
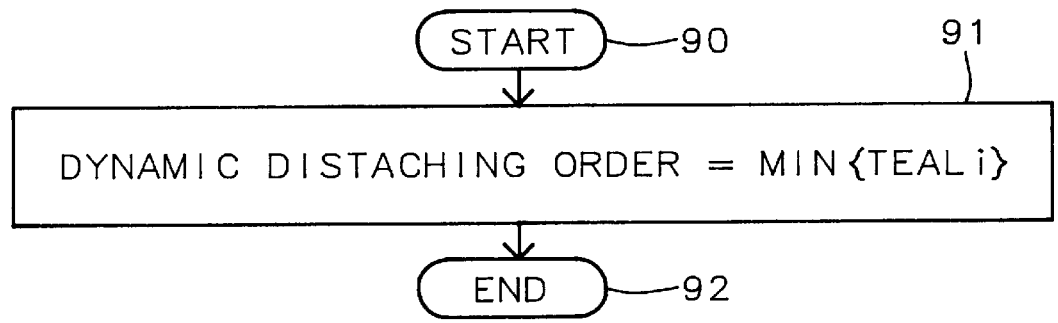
FIG. 9 shows a block diagram for choosing the minimum TEAL i which selects the first priority candidate stage, where "i" is a stage of the process, in accordance with FIG. 1.

Referring to FIG. 9, a block diagram is provided for choosing the minimum TEAL i starting in block 90 which leads to block 91 which selects the first priority candidate stage, where "i" is a stage of the process.

In block 92, the MIN {TEAL i} routine ends.

EXAMPLE

Assumptions (1) A stepper (photolithographic exposure machine) completes its process and uses the dynamic dispatching method to choose the proper candidate stages. For example, the candidate stages include X, Y, and Z. The candidate stages X, Y and Z all have 24 pieces of WIP.

(2) Candidate stage X does the N-well pattern. Candidate stage Y does the Polysilicon 1 pattern and candidate stage Z does the Contact 2 pattern.

(3) For one day span, after N-well pattern, the descendant stages for candidate stage X are N-well implant, using Mid-current implanter) and then process N-well photo resist stripe, using Implant Chemical Station) and then process N-well diffusion, using Furnace).

(4) For one day span, after the Polysilicon 1 layer is patterned, the descendant stages for candidate stage Y are processed through the polyilicon 1 etching stage, using the polysilicon etcher. Then the Polyilicon 1 stripe is processed using the polysilicon chemical station.

(5) For a one day span, after the Contact 2 pattern is formed, the descendant stages for candidate stage Z are processed for Contact 2 etching using the contact etcher, followed by processing for the contact 2 stripe using the contact chemical station.

(6) For the Mid-current Implanter (M-Implanter), it has a WIP of 72 pieces for processing of an N-Well Implant of which 48 pieces are Queued WIP and 24 pieces are running WIP and there pieces of which ⅔ are completed. There are also 72 WIP pieces for N-channel implant processing and they are all Queued WIP.

(7) For Polysilicon etcher (Poly_Etcher) it has 24 WIP pieces for processing through Polysilicon 1 etching and 36 WIP pieces for processing through Polysilicon 2 etching, and they are all Queued WIP. See the example below for the WIP status of other machines.

(8) For the Mid-current Implanter (M-Implanter), the standard time (STD time) of doing the N-Well_Implant process is 0.06 (hour/pieces) and doing the N_Channel_implant process is 0.0533 (hour/pieces).

(9) For Polysillcon etcher (Poly_Etcher), the standard time (STD time) of doing the Poly1_Etching process in 0.0632 (hour/pieces) and doing the Poly2_Etching process is 0.048 (hour/pieces). See example attachment for other process's standard time of each machine.

(10) For Mid-current Implanter (M-Implanter), the output target of doing the N_Well_Implant process in 400 (pieces/day) and doing the N_Channel_Implant process is 450 (pieces/day). The N_Well_Implant and N_Channel_Implant had output 200 pieces and 180 pieces respectively.

(11) For the Polysilicon etcher (Poly_Etcher), the output target for the Poly1_Etching process in 380 (pieces/day), and for the Poly2_Etching process it is 500 (pieces/day). The Poly1_Etching and Poly2-Etching had output 220 piece and 300 pieces respectively. See example attachment for the outputs of other stages and their output targets.

(12) Assume the remaining time is 12 hours.

Dynamic Dispatching Method (1) The achievement rate (AR) of descendant stage N_Well Implant in (24 pieces running WIP times 2/3 completed ratio plus Actual output 200 pieces) divide Stage output target= 54% Using the same calculating logic, all the AR of descendant stages can be acquired.

(2) The loading of descendant stag N_Well_Implant is, (24 pieces running WIP times 1/3 uncompleted ratio plus 48 Queued WIP) times STD time divide remaining hour 12 hour=28% Using the same calculating logic, all the Loading of descendant stages can be acquired.

(3) The Adjusted Load (AL) of descendant stage N_Well_Implant is (AR times loading)=(54% time 28%)=15%. Using the same calculating logic, all the Adjusted Loading of descendant stages can be acquired.

(4) The picked probability (PP) of descendant stage N_Well_implant and N_Channel_Implant are, considering the grouped stage N_Well_Implant and N_Channel_Implant for M-Implanter, $\Sigma(1/AL)=1/0.15+1/0.13=14.36$. The PP of N_Well_Implant will be $(1/0.15)/14.36=46\%$ and The PP of N_Channel_Implant will be $(1/0.13)/14.36=54\%$. Using the same calculating logic, all the PP of descendant stages can be acquired.

(5) The Estimated Loading (EL) of descendant stage N_Well_Implant is when chosen Candidate stage X, Adjusted Queued WIP (AQW)=Queued WIP 48 pieces+candidate stage X quantity 24 pieces*(1-picked probability 46%))=61. So, Estimated Loading (EL)=(AQW+running WIP 24 pieces*1/3)*STD Time 0.06 hour/pieces divide remaining hour 12 hour=34.5%.

(6) The Estimated Achievement Rate (EAR) of descendant stage N_Well_Implant is when chosen candidate stage X, Adjusted Equivalent Output (AEO)=(Actual output 200 pieces+running WIP 24 pieces*completed ratio 2/3+candidate stage X quantity 24 pieces*picked probability 46%=227. So Estimated Achievement Rate (EAR)=AEO/output target 400 pieces=56.75%.

(7) Consider the Estimated Adjusted Loading (EAL) of a descendant stage for an N_Well_Implant.

When Candidate stage X is chosen, then the Estimated Adjusted Loading (EAL)=(EAR*EL)=0.2.

When Y or Z is chosen, due to no change in WIP on the descendant stage for the N_Well_Implant and the N_Channel_Implant, the EAL value Is the same as the original one.

(8) The Estimated Loading (EL) of the second phase descendant stage N_Well_PR-Stripe is, when the candidate stage X is chosen, (referring to FIG. 5) the Adjusted Queued WIP (AQW) is as follows: (AQW)-candidate stage X Queued WIP (36 pieces)+quantity (24 pieces)*N_Well_Implant's picked probability 46%*(1-N_Well_PR_Stripe's Picked probability 21%)=44.72 The Estimated Loading (EL)= AQW*STD Time 0.0632 hour/pieces divided by remaining hour 12 hour=23.55%

(9) The Estimated Achievement Rate (EAR) of the second phase descendant stage N_Well_PR-Stripe is, when candidate stage X in chosen, the Adjusted Equivalent Output (AEO)=(Actual output 240 pieces+candidate stage X quantity 24 piece*N_Well_Implant's Picked Probability 46%*N_Well_PR_Stripe's picked probability 21%)= 242.3. The Estimated Achievement Rate (EAR)=AEO/output target 380 pieces=63.8%.

(10) The Estimated Adjusted Loading (EAL) of second phase descendant stage N_Well_PR_Stripe is, when chosen Candidate stage X, Estimated Adjusted Loading (EAL) =(EAR*EL)=0.15. While choosing Y or Z, due to no change in WIP on the second phase descendant stage N_Well_PR_Stripe, N_Channel_PR_Stripe and Core_PR_Stripe, so the EAL value is the same am the original EAL value, and the same calculating logic can expand to the computation of the EAL value of the third and subsequent phase descendant stages.

(11) The Total Estimated Adjusted Loading (TEAL) for candidate stage X will be, as follows:

| Stage | Descendant stage EAL on selecting X |
|---|---|
| M-Implanter | 0.2 and 0.16 |
| Poly_Etcher | 0.07 and 0.09 |
| Contact_Etcher | 0.04 and 0.13 |
| Implant-Chemical_Station | 0.08, 0.15 and 0.08 |
| Poly_Chemical_Station | 0.09, 0.04 and 0.04 |
| Contact_Chemical_Station | 0.08, 0.19 and 0.22 |
| Furnace | 0.19 and 0.08 |

Thus the TEAL for the candidate stage X is 0.93. The same method can acquire the TEAL of the candidate Y and Z which are 0.46 and 0.81 respectively.

(12) According to the TEAL of the candidate stages X, Y and Z, the dynamic dispatching order will be first priority for candidate stage Y, then stage Z, and then stage X.

| CANDIDATE LOTS | CANDIDATE STAGE |
|---|---|
| X | N_WELL_PHOTO |
| Y | Poly1_PHOTO |
| Z | C2_PHOTO |

| | | | CANDIDATE | | | | | | | | |
|---|---|---|---|---|---|---|---|---|---|---|---|
| WIP | Stage | STD Time | Target | AO | AR | Load | AL | PP | X | Y | Z |
| | | | M-IMPLANTER | | | | | | | | |
| 72 | N_Well_IMPLANT | 0.0600 | 400 | 200 | 54% | 28% | 0.15 | 0.46 | 0.20 | 0.15 | 0.15 |
| 72 | N_Channel_IMPLANT | 0.0533 | 450 | 180 | 40% | 32% | 0.13 | 0.54 | 0.16 | 0.13 | 0.13 |
| | | | IMPLANT CHEMICAL STATION | | | | | | | | |
| 24 | CORE_PR_Stripe | 0.0600 | 400 | 250 | 63% | 0.12 | 0.08 | 0.34 | 0.08 | 0.08 | 0.08 |

-continued

CANDIDATE

| WIP | Stage | STD Time | Target | AO | AR | Load | AL | PP | X | Y | Z |
|---|---|---|---|---|---|---|---|---|---|---|---|
| 36 | N_Well_PR_Stripe | 0.0632 | 380 | 240 | 63% | 0.19 | 0.12 | 0.21 | 0.15 | 0-12 | 0.12 |
| 24 | N_Channel_PR_Stripe | 0.0480 | 500 | 300 | 60% | 0.10 | 0.06 | 0.44 | 0.08 | 0.06 | 0.06 |
| | | | FURNACE | | | | | | | | |
| 64 | Well_Diff | 0.0615 | 390 | 220 | 56% | 0.33 | 0.19 | 0.31 | 0.19 | 0.19 | 0.19 |
| 24 | Field-Ox | 0.0571 | 420 | 300 | 71% | 0.11 | 0.08 | 0.69 | 0.08 | 0.08 | 0.08 |
| | | | POLYSILICON ETCHER | | | | | | | | |
| 24 | Polysilicon1_ETCHING | 0.0632 | 380 | 220 | 58% | 13% | 0.07 | 0.54 | 0.07 | 0.11 | 0.07 |
| 36 | Polysilicon2_ETCHING | 0.0480 | 500 | 300 | 60% | 14% | 0.09 | 0.46 | 0.09 | 0.12 | 0.09 |
| | | | POLYSILICON CHEMICAL STATION | | | | | | | | |
| 36 | Polysilicon1_Stripe | 0.0500 | 480 | 300 | 63% | 0.15 | 0.09 | 0.18 | 0.09 | 0.12 | 0.09 |
| 18 | Polysilicon2_Stripe | 0.0522 | 460 | 260 | 57% | 0.08 | 0.04 | 0.38 | 0.04 | 0.06 | 0.04 |
| 12 | Polysilicon3_Stripe | 0.0571 | 420 | 280 | 67% | 0.06 | 0.04 | 0.44 | 0.04 | 0.04 | 0.04 |
| | | | CONTACT ETCHER | | | | | | | | |
| 12 | C2_ETCHING | 0.0572 | 420 | 260 | 62% | 6% | 0.04 | 0.79 | 0.04 | 0.04 | 0.05 |
| 48 | C3_ETCHING | 0.0632 | 380 | 200 | 53% | 25% | 0.13 | 0.21 | 0.13 | 0.13 | 0.19 |
| | | | CONTACT CHEMICAL STATION | | | | | | | | |
| 24 | C1_Stripe | 0.0600 | 400 | 250 | 63% | 0.12 | 0.08 | 0.58 | 0.08 | 0.08 | 0.08 |
| 49 | C2_Stripe | 0.0615 | 390 | 300 | 77% | 0.25 | 0.19 | 0.23 | 0.19 | 0.19 | 0.25 |
| 72 | C3_Stripe | 0.0545 | 440 | 300 | 68% | 0.33 | 0.22 | 0.19 | 0.22 | 0.22 | 0.24 |

FIGS. 10A and 10B show the portions 100A and 100B of the fabrication plant and a computer 93 which provides control data for portions 100A and 100B of the plant. The CPU 94 is connected by lines 99 to stages 101–107 in the portion 100A of the fabrication plant. The stages 101–107 include M_Implanter 101, implant chemical station 102, furnace 103, polysilicon etcher 104, polysilicon chemical station 105, contact etcher 106, and contact chemical station 107.

FIG. 10B shows a stepper machine SM, and additional facilities ancillary thereto providing the functions N-Well pattern X1, N-Well implant X2, Resist stripe X3, N-Well diffusion X4, Polysilicon 1 pattern Y1, Polysilicon 1 etching Y2, Polysilicon 1 stripe Y3, Contact 2 pattern Z1, Contact 2 etching Z2, and Contact 2 stripe Z3.

While this invention has been described in terms of the above specific embodiment(s), those skilled in the art will recognize that the invention can be practiced with modifications within the spirit and scope of the appended claims, i.e. that changes can be made in form and detail, without departing from the spirit and scope of the invention. Accordingly all such changes come within the purview of the present invention and the invention encompasses the subject matter of the claims which follow.

Having thus described the invention, what is claimed as new desirable to be secured by Letters Patent is as follows:

1. A method of dynamic dispatching of integrated circuit wafer lots in an integrated circuit fabrication plant comprising:

determining the Stage Achievement Rate (SAR) of descendant stages for each candidate stage to be processed by the fabrication plant, said SAR is calculated with the formula as follows:

$$SAR = \frac{\text{Stage Equivalent Output } (SEO)}{\text{Stage Output Target } (SOT)},$$

SEO is calculated with the formula, as follows:

$$SEO = AO + \{CR*(R\_WIP)\}$$

where

AO is Actual Output

CR is Completed Ratio

R_WIP is Running WIP, determining the Loading of descendant stages for each candidate stage, determining the Adjusted Loading (AL), where $$AL = SAR * \left[ \begin{array}{c} \text{(Loading of descendant stages} \\ \text{for each candidate stage)}, \end{array} \right]$$

determining the Picked Probability (PP) equal to Normalized 1/AL of grouped descendant stages, determining the Estimated Loading (EL) of descendant stages for each candidate stage, determining the Estimated Achievement Rate (EAR) of descendant stages for each candidate stage, determining the Estimated Adjusted Loading (EAL) of descendant stages for each candidate stage, determining the Total Estimated Adjusted Loading (TEAL) for each candidate stage, and determining the Dynamic Dispatching Order (DDO) of the wafer lots.

2. A method in accordance with claim 1 wherein:

Stage Output Target (SOT) is obtained by the system.

3. A method in accordance with claim 1 wherein:

said Loading of descendant stages for each candidate stage is calculated with the formula as follows:

$$Loading = \frac{\text{Required Hours}}{\text{Remaining Hours}}.$$

4. A method in accordance with claim 3 wherein:
calculating determines the Required Hours wherein $$\text{Required Hours} = \left[ \text{Stage Queued WIP} + \left[ \begin{array}{c} \text{Stage Uncompleted Ratio} \end{array} \right] * \left[ \begin{array}{c} \text{Running WIP} \end{array} \right] \right] * \left[ \begin{array}{c} \text{Standard time Hours} \\ \hline \text{piece} \end{array} \right]$$

5. A method in accordance with claim 1 including:
calculating $\Sigma$ (1/AL) of same grouped descendant stage,
calculating 1/AL,
calculating Picked Probability (PP) of descendant stage "i" where the equation is calculated as follows:

$$PP = \frac{\frac{1}{AL}}{\Sigma \frac{1}{AL}}.$$

6. A method in accordance with claim 1 including:
selecting as follows:
Candidate Stage $S_i$, where i=1, 2, . . . , n and
Stage Quantity $Q_i$, where i=1, 2, . . . , n
calculating the value of the Adjusted Queued WIP (AQW) as follows:

(AQW)=Queued WIP+{$Q_i$*(1-PP)} calculating the value of the Adjusted Required Hours (ARH) as follows:

ARH=AQW+(UR*running WIP)*STD Time where
UR=Uncompleted Ratio and
R_WIP=Running WIP
calculating Estimated Loading (EL) as follows:

$$(EL) = \frac{\text{Adjusted required hours}}{\text{Remaining Hours}}.$$

7. A method in accordance with claim 1 including selecting as follows:
Candidate Stage $S_i$, where i=1, 2, . . . , n and
Stage Quantity $Q_i$, where i=1, 2, . . . , n
calculating the value of the Adjusted Equivalent Output (AEO) as follows:

AEO=AO+(Qi*PP)+(CR×R_WIP)

AO=Actual Output
Qi=Stage Quantity
PP=Picked Probability
CR=Completed Ratio
R_WIP=Running WIP
calculating the value of the Estimated Achievement Rate (EAR) as follows:

$$EAR = \frac{AEO}{SOT}$$

where
AEO=Adjusted Equivalent Output
SOT=Stage Output Target.

8. A method in accordance with claim 1 including as follows:
calculating the Estimated Adjusted Loading (EAL) from said Estimated Loading (EL) data and said Estimated Achievement Rate (EAR) data, as follows:

EAL=EL*EAR.

9. A method in accordance with claim 1 including calculating said TEAL as follows:

TEAL=$\Sigma$EAL.

10. A method in accordance with claim 1 including selecting the first priority candidate stage, where "i" is a stage of the process comprising:
determining the Dynamic Dispatching Order (DDO)=Min {TEAL i} which is the minimum value of the TEAL of stage i, where i=1, 2, . . . , n is an integer representing the stage currently under consideration depending upon the number of stages which are required for the particular fabrication facility.

11. A manufacturing control system for dynamic dispatching of integrated circuit wafer lots in an integrated circuit fabrication plant comprising:
means for determining the Stage Achievement Rate (SAR) of descendant stages for each candidate stage to be processed by the fabrication plant,
said SAR is calculated with the formula as follows:

$$SAR = \frac{\text{Stage Equivalent Output }(SEO)}{\text{Stage Output Target }(SOT)},$$

SEO is calculated with the formula, as follows:

SEO=AO+{CR*(R_WIP)} where
AO is Actual Output
CR is Completed Ratio
R_WIP is Running WIP,
means for determining the Loading of descendant stages for each candidate stage,
means for determining the Adjusted Loading (AL), where $$AL = SAR * \left[ \begin{array}{c} \text{(Loading of descendant stages} \\ \text{for each candidate stage),} \end{array} \right]$$

means for determining the Picked Probability (PP) equal to Normalized 1/AL of grouped descendant stages,
means for determining the Estimated Loading (EL) of descendant stages for each candidate stage,
means for determining the Estimated Achievement Rate (EAR) of descendant stages for each candidate stage,
means for determining the Estimated Adjusted Loading (EAL) of descendant stages for each candidate stage,
means for determining the Total Estimated Adjusted Loading (TEAL) for each candidate stage, and
means for determining the Dynamic Dispatching Order (DDO) of the wafer lots.

12. A manufacturing control system in accordance with claim 11 wherein:
Stage Output Target (SOT) is obtained by the system.

13. A manufacturing control system in accordance with claim 11 wherein:
said Loading of descendant stages for each candidate stage is calculated with the formula as follows:

$$\text{Loading} = \frac{\text{Required Hours}}{\text{Remaining Hours}}.$$

14. A manufacturing control system in accordance with claim 13 wherein:
means for calculating determines the Required Hours wherein $$\text{Required Hours} = \left[\begin{array}{c}\text{Stage}\\\text{Queued}+\\\text{WIP}\end{array}\right] \left[\begin{array}{c}\text{Stage}\\\text{Uncompleted}\\\text{Ratio}\end{array}\right] * \left[\begin{array}{c}\text{Running}\\\text{WIP}\end{array}\right] * \left[\begin{array}{c}\text{Standard}\\\text{time}\\\frac{\text{Hours}}{\text{piece}}\end{array}\right]$$

15. A manufacturing control system in accordance with claim 11 including:
means for calculating $\Sigma (1/AL)$ of same grouped descendant stage,
means for calculating $1/AL$,
means for calculating Picked Probability (PP) of descendant stage "i" where the equation is calculated as follows:

$$PP = \frac{\frac{1}{AL}}{\Sigma \frac{1}{AL}}.$$

16. A manufacturing control system in accordance with claim 11 including:
means for selecting as follows:
Candidate Stage $s_i$, where i=1, 2, . . . , n and
Stage Quantity $Q_i$, where i=1, 2, . . . , n
means for calculating the value of the Adjusted Queued WIP (AQW) as follows:

(AQW)=Queued WIP+{$Q_i$*(1-PP)} means for calculating the value of the Adjusted Required Hours (ARH) as follows:

ARH=AQW+(UR*running WIP)*STD Time where
UR=Uncompleted Ratio and
R_WIP=Running WIP means for calculating Estimated Loading (EL) as follows:

$$(EL) = \frac{\text{Adjusted required hours}}{\text{Remaining Hours}}.$$

17. A manufacturing control system in accordance with claim 11 including means for selecting as follows:
Candidate Stage $S_i$, where i=1, 2, . . . , n and
Stage Quantity $Q_i$, where i=1, 2, . . . , n
means for calculating the value of the Adjusted Equivalent Output (AEO) is as follows:

AEO=AO+(Qi*PP)+CR×R_WIP

AO=Actual Output
Qi=Stage Quantity
PP=Picked Probability
CR=Completed Ratio
R_WIP=Running WIP, and
means for calculating the value of the Estimated Achievement Rate (EAR) is as follows:

$$EAR = \frac{AEO}{SOT}$$

where
AEO=Adjusted Equivalent Output
SOT=Stage Output Target.

18. A manufacturing control system in accordance with claim 11 including as follows:
means for calculating the Estimated Adjusted Loading (EAL) from said Estimated Loading (EL) data and said Estimated Achievement Rate (EAR) data, as follows:

EAL=EL*EAR.

19. A manufacturing control system in accordance with claim 11 including means for calculating said TEAL as follows:

TEAL=ΣEAL.

20. A manufacturing control system in accordance with claim 11 including means for selecting the first priority candidate stage, where "i" is a stage of the process comprising:
means for determining the Dynamic Dispatching Order (DDO)=Min {TEAL i} which is the minimum value of the TEAL of stage i, where i=1, 2, . . . , n is an integer representing the stage currently under consideration depending upon the number of stages which are required for the particular fabrication facility.

* * * * *